United States Patent
Tanikoshi

[11] 3,896,358
[45] July 22, 1975

[54] SYNCHRONOUS DRIVE SYSTEM FOR A D.C. MOTOR

[75] Inventor: Kinji Tanikoshi, Kawasaki, Japan

[73] Assignees: Canon Seiki Kabushiki Kaisha; Canon Kabushiki Kaisha, both of Tokyo, Japan

[22] Filed: July 17, 1974

[21] Appl. No.: 489,088

[30] Foreign Application Priority Data
July 24, 1973  Japan................ 48-83277

[52] U.S. Cl. ............... 318/314; 318/318; 318/327
[51] Int. Cl. ......................................... H02p 5/16
[58] Field of Search .......... 318/314, 318, 327, 328, 318/434

[56] References Cited
UNITED STATES PATENTS

| | | | |
|---|---|---|---|
| 3,331,006 | 7/1967 | Strand et al. .................. | 318/318 X |
| 3,478,178 | 11/1969 | Grace .......................... | 318/318 X |
| 3,546,553 | 12/1970 | Loyd........................... | 318/318 |
| 3,753,067 | 8/1973 | Milligan ....................... | 318/314 |
| 3,772,580 | 11/1973 | Odone .......................... | 318/318 |

*Primary Examiner*—G. Z. Rubinson
*Attorney, Agent, or Firm*—Fitzpatrick, Cella, Harper & Scinto

[57] ABSTRACT

A synchronous drive system for rotating D.C. motor synchronous with a reference signal with a predetermined frequency. The system comprises a first signal system for transmitting synchronous drive signals by a flip-flop circuit which responds to signals from a reference signal generator and to signals corresponding to motor speed. The system further comprises a second signal system for increasing duty of motor driving current, the signal being fed to the first signal system so as to make the value of the duty of motor preferably close to 100%. The system further comprises a third signal system for generating braking signals during a suspension period of motor driving current so as to increase duty.

16 Claims, 8 Drawing Figures

SYNCHRONOUS DRIVE SYSTEM FOR A D.C. MOTOR

BACKGROUND OF THE INVENTION

1. Field of the Invention

The present invention relates to synchronous drive systems for a D.C. motor and more particularly to a synchronous drive system adapted to obtain highly accurate torque by varying reversible rotation of the motor and duty of drive current.

2. Description of the Prior Art

Various conventional methods of synchronously rotating a D.C. motors at a predetermined reference speed have been proposed, one of which is a method which detects a phase difference between the reference pulse with frequency corresponding to the reference speed and the speed pulse with frequency corresponding to the rotational speed of the motor thereby generating rectangular waveform drive signals so that the D.C. motor may be driven.

The conventional method as described above possesses a disadvantage such that driving current is intermittently fed to the driving coil of motor so that torque fluctuation is likely produced particularly when the load of the motor is reduced.

SUMMARY OF THE PRESENT INVENTION

The present invention overcomes the disadvantage noted above with respect to the above-described conventional synchronous drive system and has as its object to provide a highly accurate synchronous drive system which can avoid torque fluctuation particularly at a reduced load.

It is a further object of this invention to provide a synchronous drive system in which means for adjusting duty of motor is provided with the conventional synchronous drive system for a D.C. motor so that said duty may always be controlled to be close to 100% thereby reducing torque fluctuation.

It is another object of this invention to provide a synchronous drive system for a D.C. motor in which a voltage regulating circuit controlled by the signal of difference between a reference duty signal and a motor drive signal is used to automatically control voltage applied to the output stage in a motor synchronous drive circuit so as to set the duty of motor drive current to a predetermined value.

It is yet another object of this invention to provide a synchronous drive system for a D.C. motor in which a reference duty signal is converted into an analog signal and a motor drive signal is converted into an analog signal, and the difference between these analog signals is detected so that the duty of motor drive current may be set by said difference signal to a predetermined value.

It is still another object of this invention to provide a synchronous drive system for a D.C. motor in which a transistor bridge connection circuit is provided with the output stage of a D.C. motor synchronous drive circuit, and motor drive signal and control signal are supplied to said transistor bridge connection circuit and inputs of these signals are then changed-over to thereby to obtain reversible rotation of the motor.

It is a further object of this invention to provide a synchronous drive system for a D.C. motor in which means for energizing said motor in the reversed direction for a fixed time within a suspension period of motor drive current drives said motor as though it is apparently loaded so that the duty of drive current may be increased and the torque fluctuation at a reduced load may be decreased.

Various other objects, features and advantages of the invention will be apparent from the detailed description of the preferred embodiment thereof set forth hereinafter and shown in the accompanying drawings.

DESCRIPTION OF THE PREFERRED EMBODIMENTS

First, the principle of the construction of the synchronous drive system for a D.C. motor in accordance with the present invention and the operation thereof will now be described with reference to FIG. 1.

A reference signal generator 1 having a reference frequency for driving a D.C. motor at a fixed speed (hereinafter referred to as a reference speed) is connected to a circuit 2 for differentiating and rectifying the reverence signal generated therefrom to obtain either positive or negative pulse signals, and said differential and rectifying circuit is connected to the set terminal (S) in a flip-flop circuit 5. On the other hand, a detector 3 such as an A.C. tachogenerator for detecting rotational speed or a D.C. motor 8 is connected through a circuit 4, which shapes, differentiates and rectifies output therefrom, to the reset terminal in the flip-flop circuit 5. The output terminal in the flip-flop circuit 5 is connected through an amplifier 6 to one input terminal in signal switching means 11. The output terminals in the switching means 11 are connected to a drive circuit 7 for the D.C. motor 8. The signal transmission circuit comprised of $$\genfrac{}{}{0pt}{}{1-2}{3-4} > \quad 5-6-11-7-8$$

is used for normal synchronous drive, which is hereinafter referred to as a first signal transmission system.

The aforementioned reference signal generator 1 has a delay signal generating circuit 12 connected thereto, which circuit has a phase function to shift the reference pulse signal from the generator 1 for a fixed time within one period and further has a function to generate a rectangular waveform signal corresponding to the phase difference between the pulse so shifted and the reference pulse.

This circuit 12 generates a digital signal, and is connected to a D - A converter 13 adapted to convert said digital signal into an analog signal, and the converter 13 is connected to one input terminal in an analog signal comparing circuit 14. The comparing circuit 14 has the other input terminal connected to a D - A converter 15 which is connected to the output terminal in the flip-flop circuit 5 through the input terminal thereof to convert the output signal therefrom into an analog signal. The comparing circuit 14 has its output terminal connected to a voltage regulating circuit 9 connected to the drive circuit 7. The circuit comprised of $$1 - \genfrac{}{}{0pt}{}{12 - 13}{5 - 15} > 14 - 9 - 7 - 8$$

is a group of circuits provided for increasing duty of D.C. motor 8 driving current to the greatest value possible so as to decrease torque fluctuation, which is hereinafter referred to as a second signal transmission system.

Connected to the output terminal in the flip-flop circuit 5 is a circuit 10 for applying a braking pulse signal when the drive signal from the circuit 5 is suspended. The circuit 10 includes a monostable multivibrator, the output of which is connected to the other input terminal in said signal switching means 11. This circuit comprised of 5 10– 11 – 7 – 8 is hereinafter referred to as a third signal transmission system.

Operation of those circuits as described above will now be described with reference to FIGS. 5 and 6.

First, the above-described first signal transmission system will be described. In operation, the reference signal with frequency corresponding to the reference speed generated from the reference signal generator 1 is shown in FIG. 5(A), the period of the signal being designated as $t_1$.

Figure 5:
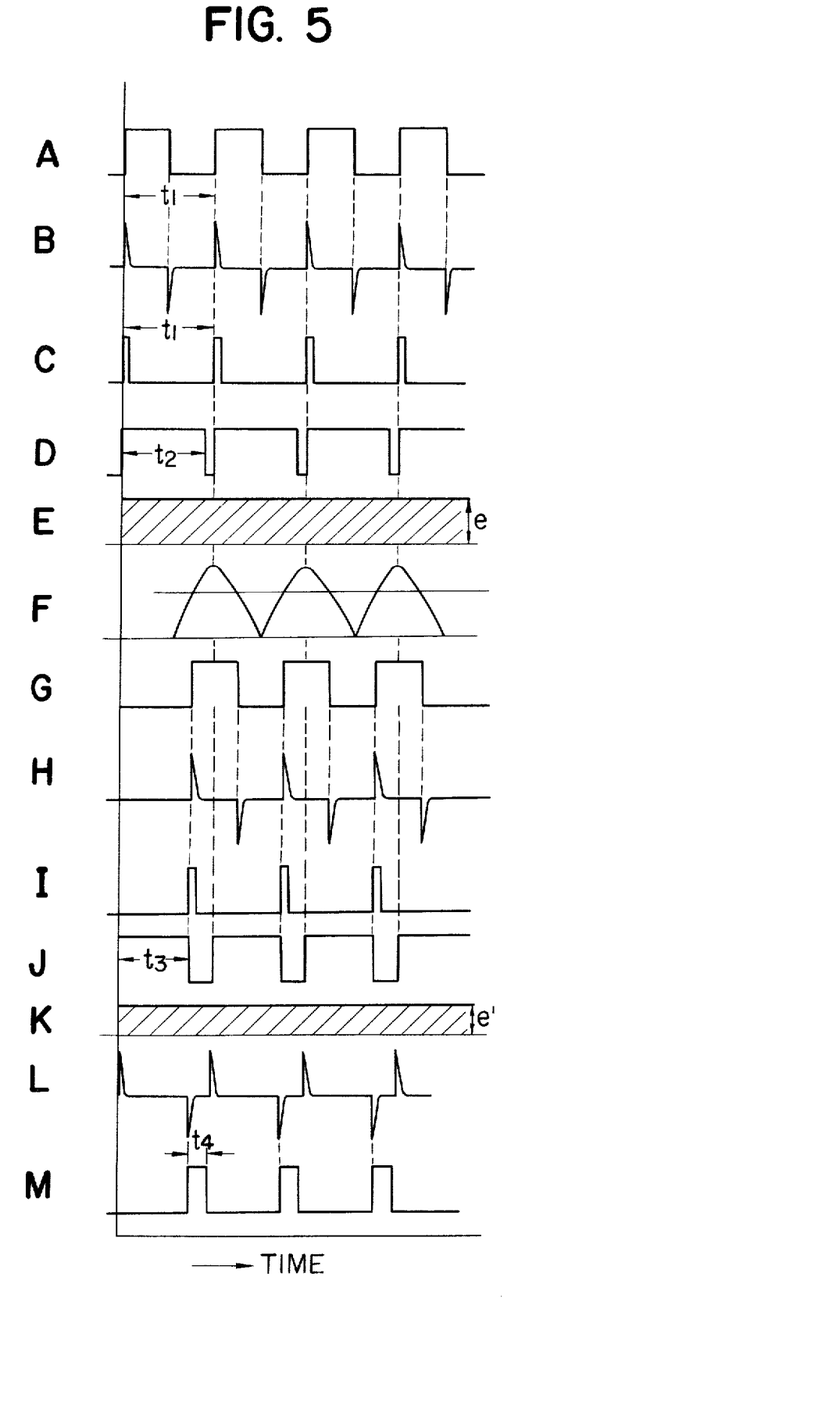
FIGS. 5 and 6 are graphs showing output signal waveforms by time with respect to the circuit diagrams of FIG. 1–4.

This signal is differentiated in the circuit 2 to form a signal waveform as shown in FIG. 5(B), which is further rectified in the same circuit to form a signal waveform as shown in FIG. 5 (C), and such a pulse-like reference signal is fed to the set input terminal in the flip-flop circuit 5 to place said circuit 5 in operative condition (hereinafter referred to as ON condition). In the case where an A.C. tachogenerator serves as the motor speed detector 3, an A.C. signal shown in FIG. 5(F) parallel to the speed of the motor 8 is generated from the tachogenerator and is shaped in the circuit 4 to form a waveform as shown in FIG. 5(G), said signal being further differentiated to form a waveform as shown in FIG. 5(H) and finally rectified to form a waveform as shown in FIG. 5(I). The pulse signal (hereinafter referred to as a speed pulse) after so rectified is supplied to the reset input terminal (R) in the flip-flop circuit 5, which is then placed in inoperative condition (hereinafter referred to as OFF condition) in response thereto.

The flip-flop circuit 5 is set by the reference pulses and reset by the speed pulses so that a rectangular waveform signal as shown in FIG. 5(J) having a pulse length corresponding to the phase difference therebetween is generated in the output of the circuit 5. The relations therebetween are depicted in FIG. 6, that is, in the case of the speed pulse shown in FIG. 6(B) with respect to the reference pulse shown in FIG. 6(A), the output rectangular waveform signal in the flip-flop circuit 5 is as shown in FIG. 6(C), and in the case of the speed pulse shown in FIG. 6(D), the output waveform in the flip-flop circuit is as shown in FIG. 6(E), Such an output from the circuit 5 is amplified by the amplifier 6 and is applied through the input switching circuit 11 to one input terminal in the drive circuit 7, and the D.C. motor 8 is driven by the output from the circuit 7.

Figure 6:
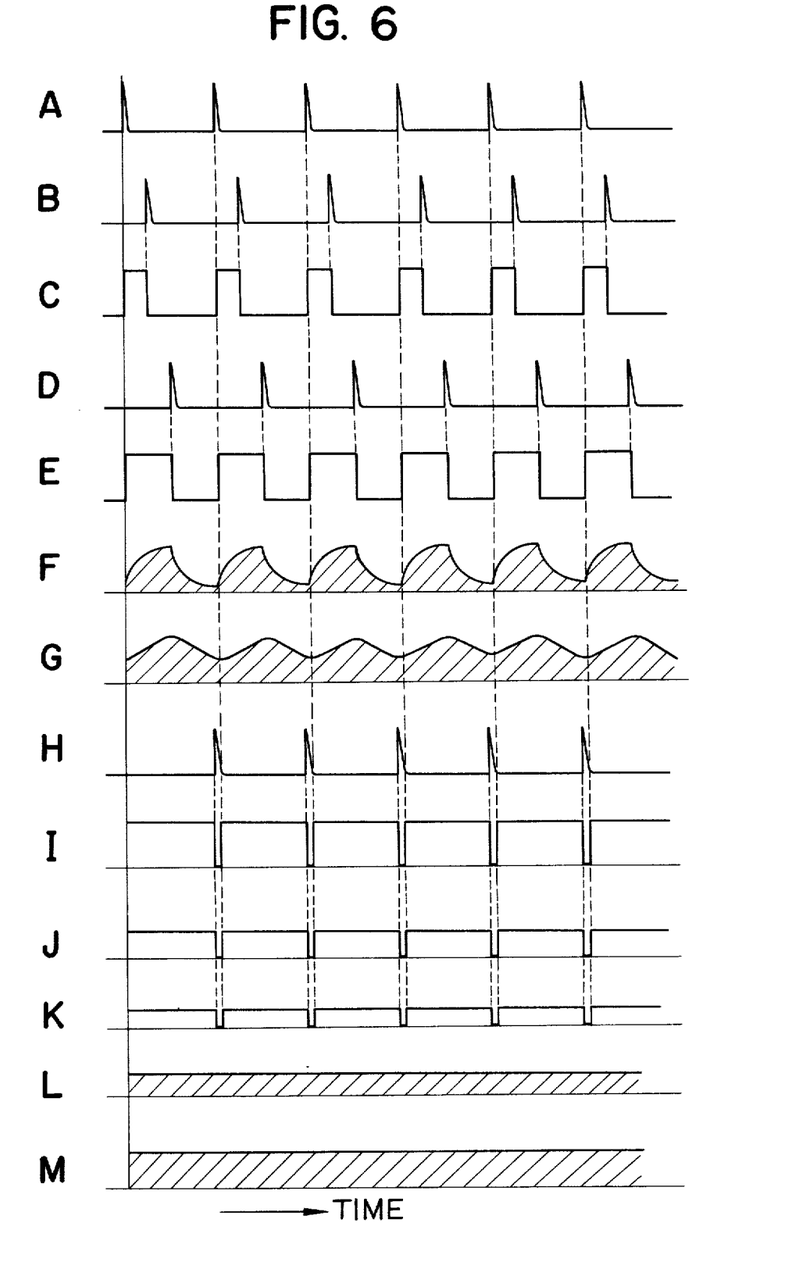

The mode of synchronously driving a D.C. motor by controlling pulse width of signal waveforms as shown in FIGS. 6(C) or (E) has been described. For example, when the voltage of rectangular waveform pulses as shown in FIG. 6(E) is applied to the motor, driving current as shown in FIG. 6(F) is flown into the coil. Torque generated thereby has a waveform as shown in FIG. 6(G).

The synchronous drive method alone by way of the first signal transmission system as described above tends to produce torque fluctuation in the case of a reduced load.

Next, the circuit construction for forming the second signal system shown in FIG. 1 will be described with reference to FIG. 2.

Figures 1, 1B:
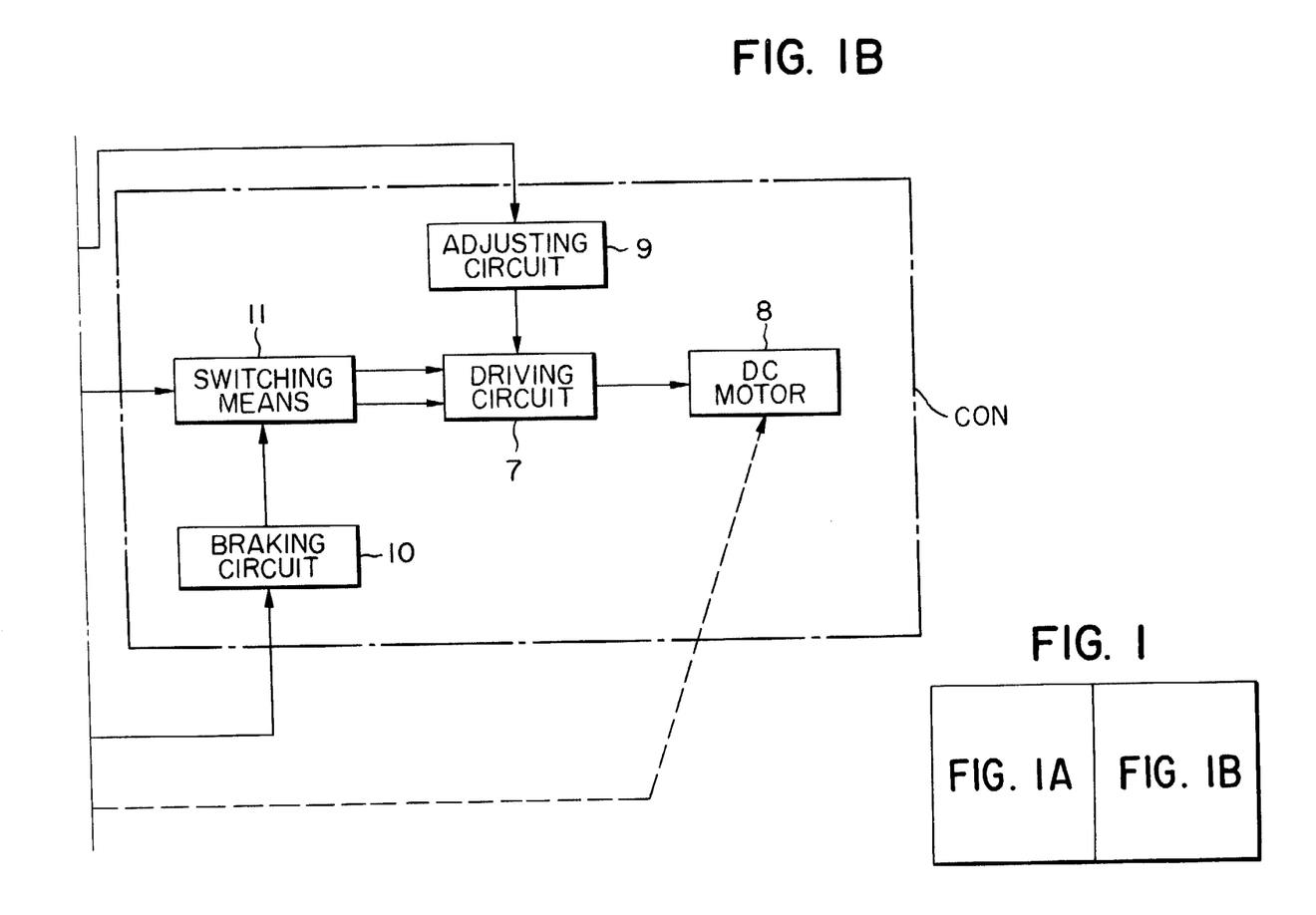
FIGS. 1A and 1B comprise a block diagram of a synchronous drive system for a D.C. motor constructed in accordance with the present invention.
Figure 1A:
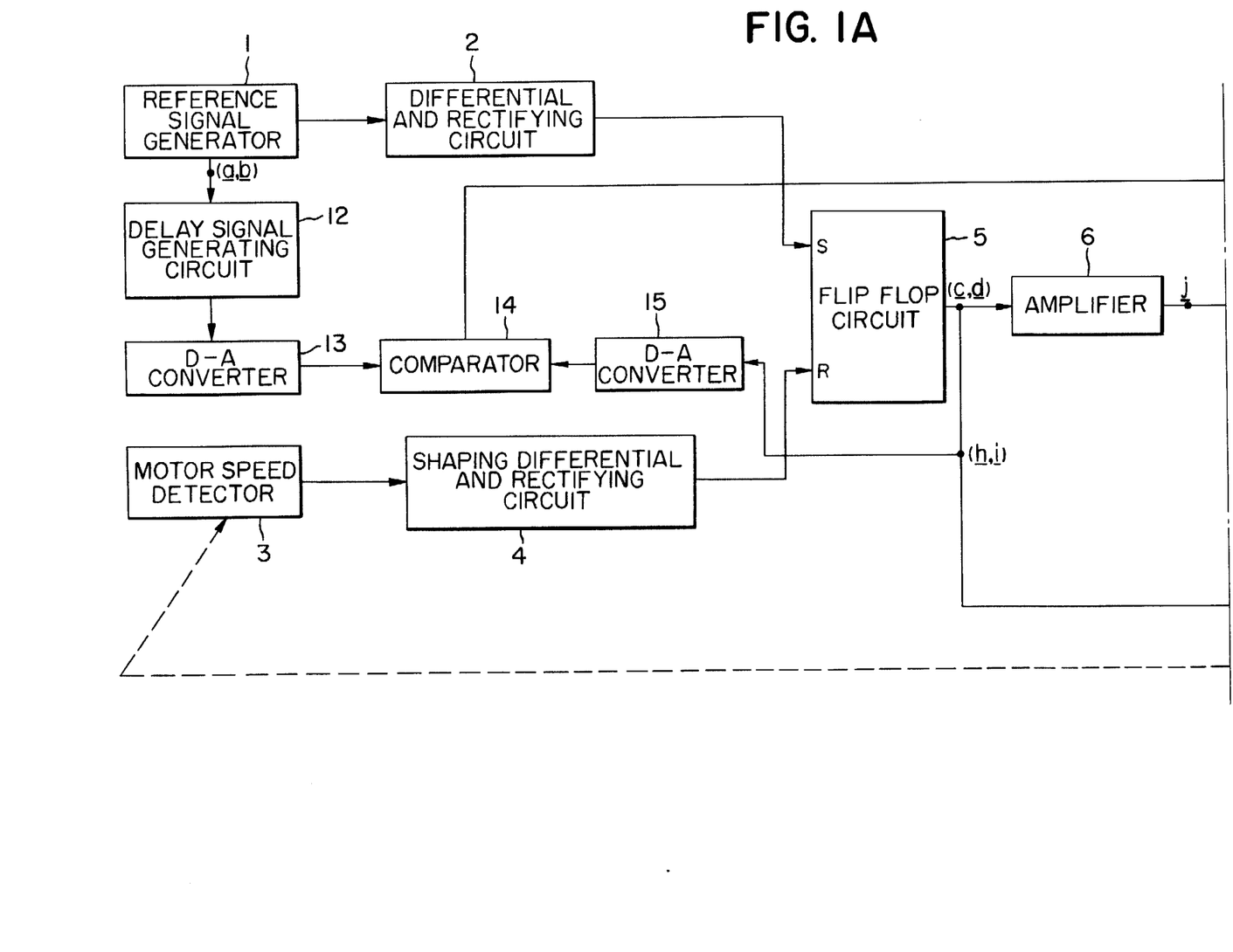
Figure 2:
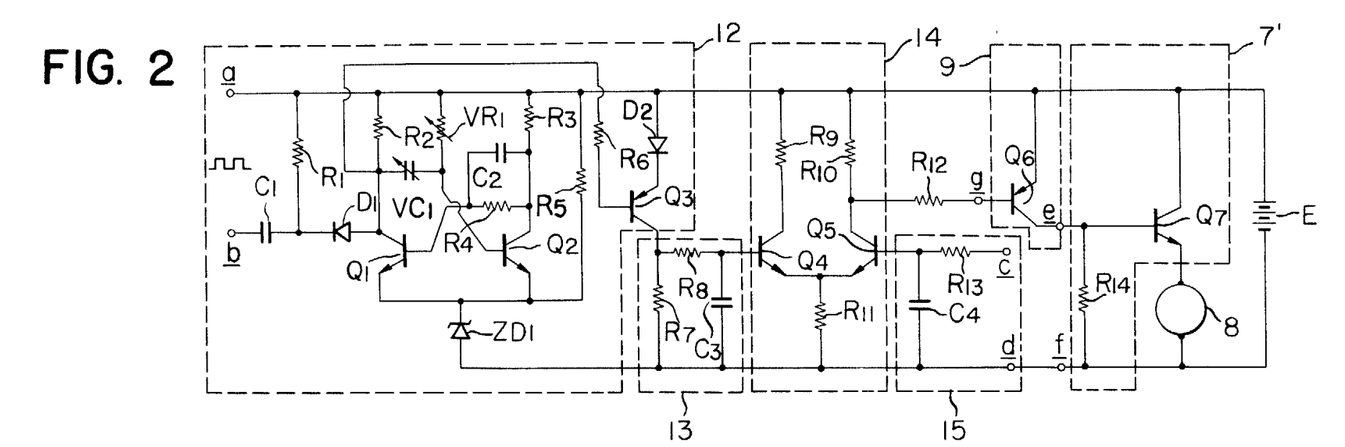
FIG. 2 is a circuit diagram of the contents of the block diagram shown in FIG. 1.

FIG. 2 illustrates the same blocks 12, 13, 14, 15, and 9, the motor 8 as in FIG. 1, and a circuit 7' in the modified form of the block 7 shown in FIG. 1 for the purpose of explaining the second signal system.

The delay signal generating circuit 12 has terminals ($a$) and ($b$) connected to the reference signal generator 1 and consists of a differentiating resistor $R_1$, a capacitor $C_1$ and a rectifying diode $D_1$. This circuit 12 further includes a monostable multivibrator which comprises transistors $Q_1$ and $Q_2$, resistors $R_2 - R_4$, a capacitor $C_2$, a variable resistor $VR_1$, and a variable capacitor $VC_1$, and the monostable multivibrator has its output terminal connected through a resistor $R_6$ to the multivibrator output amplifying transistor $Q_3$. Zener diode $ZD_1$ is connected between the multivibrator and the negative terminal of the power source E so as to apply the reference voltage to the emitter terminal common to transistors $Q_1$ and $Q_2$. A resistor $R_5$ is inserted between said common emitter and the positive terminal of the power source. A diode $D_2$ is connected to the emitter of the transistor $Q_3$ and serves for setting the level of the transistor.

A well-known D - A converter 13 is connected to the collector of the transistor $Q_3$ and comprises a load resistor $R_7$, and integrating resistor $R_8$, and a capacitor $C_3$, and the converter 13 has its output terminal connected to one input terminal in the analog comparing circuit 14.

This comparing circuit 14 is comprised of a well-known differential amplifier and comprises a pair of transistors $Q_4$ and $Q_5$ with the same polarities, resistors $R_9$, $R_{10}$ and $R_{11}$.

The base of the transistor $Q_5$ forming the other input terminal in the comparing circuit is connected to a D - A converter 15 having terminals ($c$) and ($d$) connected to output terminals in the flip-flop circuit 5. Similarly to the converter 13 previously described, the converter 15 comprises an integrating resistor $R_{13}$ and a capacitor $C_4$.

The comparing circuit 14 has its output terminal connected through a resistor $R_{12}$ to a voltage regulating circuit 9 for the D.C. motor 8 drive circuit 7'.

The mode of operation of the circuits shown in FIGS. 1 and 2 will be described with reference to FIGS. 5 and 6 showing signal waveforms.

When the reference signal as shown in FIG. 5(A) from the reference signal generator 1 is supplied to the input terminal in the delay signal generating circuit 12, the differentiation by the resistor $R_1$ and the capacitor $C_1$ is initiated and the recification is initiated by the diode $D_1$ to supply the signal to the collector of the transistor $Q_1$, which forms a portion of the monostable multivibrator. In response to supplying signal into the collector as described above, the monostable vibrator generates pulse signals at regular intervals in accordance with the time constant preset by the resistor $VR_1$ and the capacitor $VC_1$, said signal having the pulse interval $t_2$ ($t_2 < t_1$) as shown in FIG. 5(D). Preferably, the interval $t_2$ is placed toward the interval $t_1$ to the closest possible. After the output signal corresponding to the reference signal delayed for a fixed time has been amplified by the amplifying transistor $Q_3$, it is converted by the first D - A converter 13 into an analog signal having a level (e) as shown in FIG. 5(E).

On the other hand, the output signal as shown in FIG. 5(J) of the flip-flop circuit 5 in the aforementioned first signal system is supplied to the second D - A converter 15 and is likewise converted into an analog signal in the form of a signal having a level (e') as shown in FIG. 5(K). Assume now that the pulse interval of the output waveform in the flip-flop circuit 5 is as at $t_3$ in FIG. 5(J). When converted into the analog signals, the digital signal having the pulse intervals $t_2$ and $t_3$ shown in FIGS. 5(D) and (J) are turned into the analog signals having the levels (e) and (e') in proportion to the product of respective pulse intervals and amplitudes thereof.

Thus, in order to set the duty of motor driving current to a value close to 100% so as to avoid torque fluctuation even when the D.C. motor is driven with a reduced load, the pulse interval $t_2$ of the output signal in the circuit 12 is preferably brought closest possible to the period $t_1$ of the reference signal. This interval $t_2$ is determined by the expression:

$t_2 = VC_1 \cdot VR_1 \cdot \ln(2)$ As a result, the interval $t_2$ may be varied by varying the capacity of $VC_1$ and $VR_1$. If the interval $t_2$ is selected as described above, the torque fluctuation, for example, when the motor load becomes reduced, may be removed. This is because of synchronous drive of motor by the duty close to 100% as is explained below. That is to say, the level (e') of signal obtained by analogizing the output from the flip-flop circuit 5 when driven by the first signal system alone is not greater than the level (e) of signal obtained by analogizing the aforesaid delay signal.

Accordingly, the voltage drop between opposite sides of the resistor $R_{10}$ connected to the collector of the transistor $Q_5$ in the comparing circuit 14 to which analog signals are supplied decreases the base current of the transistor $Q_6$ in the voltage regulating circuit. For this reason, the collector current of the transistor $Q_6$ decreases while the voltage $V_{CE}$ between the collector and the emitter of the transistor $Q_6$ increases. The voltage $V_M$ applied to the motor is given by $$V_M = V_E - V_{CE}$$

Where $V_E$ is the voltage of power source.

In this case, the voltage $V_{CE}$ is greater, and the voltage $V_M$ becomes smaller. Consequently, the amount of power supply per unit hour decreases so that the duty of motor driving current may be increased by the amount corresponding to the amount so decreased. Thus, the D.C. motor may be synchronously driven with the duty having the value substantially equal to the pulse interval $t_2$ of the above-described delayed reference signal. When the pulse length $t_2$ of output signal in the delay signal generating circuit coincides with the pulse lenght $t_3$ of output signal in the flip-flop circuit, the level may be given by $$e = e',$$

and the synchronous drive may be effected when the duty coincides with the interval determined by the interval $t_2$ preferably at the value substantially close to 100%. The waveforms of voltage applied to the motor during balanced rotation as described above is varied in level according to the magnitude of load, but duties thereof are all equal to each other as shown in FIGS. 6(I), (J) and (K). Even at a reduced load, driving current shown in FIG. 6(L) corresponding to FIG. 6(K) is obtained, and in this case, torque produced is substantially flat and uniform as shown in FIG. 6(M) thus providing an extremely smooth rotation of motor.

Next, the circuit construction of a motor reversion control circuit CON (surrounded by the chain line) applied to FIG. 1 will be described. In the drawing there is shown a circuit 11 for reversing and switching two signal inputs to the motor drive circuit 7, that is, one input being a motor synchronous driving signal in the aforementioned first signal system, and the other being a control signal in the third signal system later described.

Figure 3:
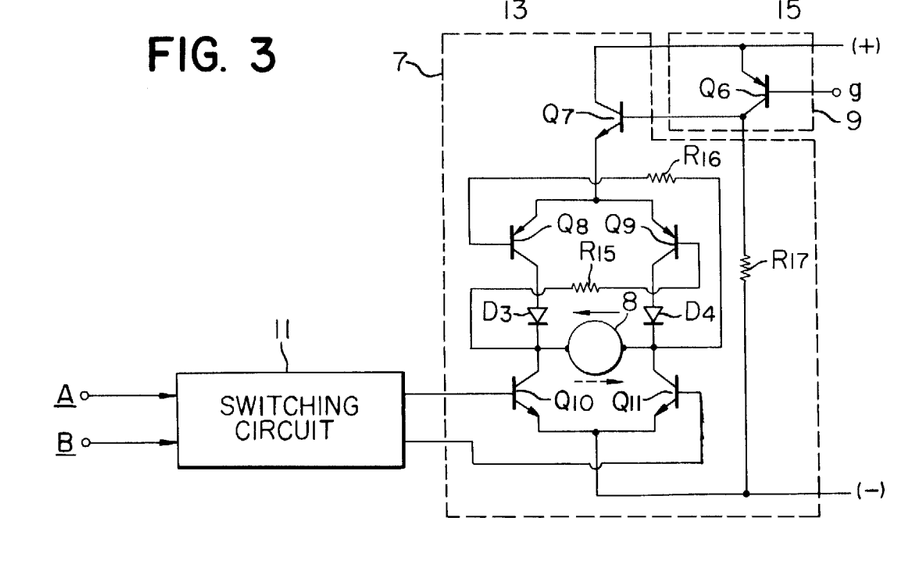
FIG. 3 is a circuit diagram of one preferred embodiment of a switching circuit for reversely rotating the motor and a transistor bridge circuit connected to said switching circuit, shown in FIG. 1.

In FIG. 3, motor drive circuit 7 comprises bridge connection transistors $Q_8 - Q_{11}$ and current direction controlling diodes $D_3$ and $D_4$ inserted between the common collectors thereof, and D.C. motor 8 is connected between said common collectors. Resistor $R_{16}$ is inserted between the base of transistor $Q_8$ and the collector of transistor $Q_{11}$, and resistor $R_{15}$ is inserted between the base of transistor $Q_9$ and the collector of transistor $Q_{10}$. In this bridge connection type transistor circuit, the common emitters of transistors $Q_8$ and $Q_9$ are connected through the transistor $Q_7$ to the voltage regulating circuit 9 previously described. The collector of transistor $Q_7$ is connected to the positive terminal of the power source, and the common emitters of transistors $Q_{10}$ and $Q_{11}$ ae connected to the negative terminal of the power source. The outputs of aforementioned switching means 11 are connected to the bases of transistors $Q_{10}$ and $Q_{11}$, respectively. The voltage regulating circuit 9 has an input terminal (g) connected to the terminal (g) in FIG. 2.

The mode of operation of the reversion controlling drive circuit will now be described. Assume now that the rectangular waveform driving signal having a duty from the amplifying circuit 6 shown in FIG. 1 is supplied to the terminal (A), and a control signal from the circuit 10 shown in FIG. 1 is supplied to the terminal (B) during a period of suspension of said driving signal. If the condition of the switching circuit 11 is driven into the first condition wherein the signal from the terminal (A) is applied to the base of the transistor $Q_{10}$ and the signal from the terminal (B) is applied to the base of the transistor $Q_{11}$, the transistor $Q_{10}$ is turned ON while the transistor $Q_{11}$ is turned OFF during a conducting period of driving signals whereby the transistor $Q_9$ is turned ON while the transistor $Q_8$ is turned OFF. As a result, current is flown to the motor 8 in the direction as indicated by the solid arrow on the order of positive (+) terminal of power source $-Q_7 - Q_9 - D_4 - 8 - Q_{10}$ — negative (−) terminal of power source, thereby rotating the D.C. motor in the proper direction. Since the supply of a control signal later described from the terminal B during a period of suspension of driving current causes the transistor $Q_{11}$ to be turned ON, braking current is flown into the motor 8 in the direction (as indicated by the dotted line arrow) on the order of positive (+) terminal of power source − $Q_7$ − $q_8$ − D 3 − 8 − $Q_{11}$ −negative (−) terminal of power source so as to effect braking in the attempt to rotate the motor in the reverse direction. When the switching circuit 11 is then inverted so that the terminal A is connected to the transistor $Q_{11}$ while the terminal B is connected to the base of the transistor $Q_{10}$, driving current is flown into the motor 8 in the direction as indicated by the dotted line arrow during a conducting period of driving current in a manner reversed to the former case, thereby reversing the motor. Further, driving current is flown into hte motor in the direction as indicated by the solid arrow during a period of suspension of conduction, and the motor makes an attempt to rotate in a proper direction to effect braking thereby. When control voltage from the comparing circuit 14 shown in FIG. 2 is supplied to the input terminal (g), the circuit comprised of transistors $Q_6$ and $Q_7$ responds to the input voltage applied to the terminal (g) so that the conducting level relative to the bridge type transistor circuit may be controlled.

Figure 4:
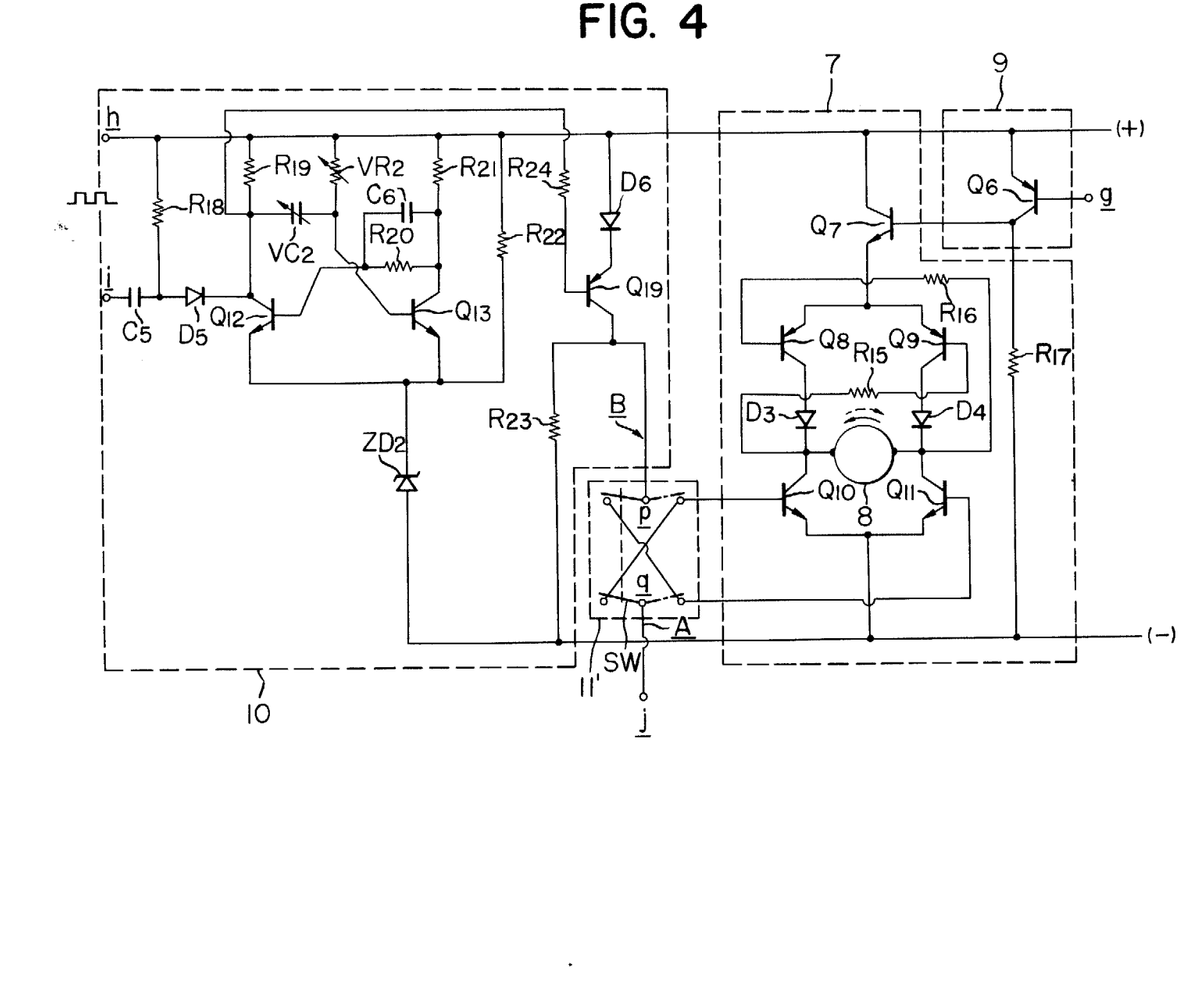
FIG. 4 is a circuit diagram of one preferred embodiment of a circuit, shown in FIG. 1, for effecting energization of the motor in the reverse direction for a fixed time during a suspension period of energization and braking the same.

FIG. 4 illustrates one preferred embodiment of a detailed construction of a controlling control-signal generating circuit 10 in accordance with the aforementioned third signal system connected to the reversion controlling motor drive circuit 7 shown in FIG. 3, and the switching circuit 11', in which parts corresponding to those shown in FIG. 3 are designated as like reference characters, description thereof being omitted.

The braking signal generating circuit 10 has input terminals (h) and (i) connected to output terminals in the flip-flop circuit 5 shown in FIG. 1 and comprises a differentiating resistor $R_{18}$, a capacitor $C_5$ and a rectifying diode $D_5$. The circuit 10 includes a monostable multivibrator comprising transistors $Q_{12}$ and $Q_{13}$, resistors $R_{19}$ and $R_{20}$, a capacitor $C_6$, a variable resistor $VR_2$, and a variable capacitor $VC_2$, the output terminal of said vibrator being connected through a resistor $R_{24}$ to an amplifying transistor $Q_{19}$. A resistor $R_{22}$ is inserted between the positive (+) terminal of power source and the common emitters of transistors $Q_{12}$, $Q_{13}$. A zener diode $ZD_2$ is inserted between the negative (−) terminal of power source and the common emitters as described above. Resistor $R_{23}$ is the collector resistor of the transistor $Q_{14}$, said collector being connected to the common terminal (p) in the interlocking change-over switching means 11' which constitutes the aforementioned switching means. The other common terminal (q) is connected to the output terminal (j) in the amplifying circuit 6 shown in FIG. 1. The change-over switch SW is shown in such a position as to rotate the motor 8 as previously discussed in conjunction with FIG. 3 in the proper direction (as indicated by the solid arrow), and when switch SW is reversed, the motor 8 is reversed in rotation as previously described.

Next, the mode of operation of controlling signal generation in the above-described third signal system will be described with reference to FIGS. 4 and 5.

When input signal from the flip-flop circuit 5, as shown in FIG. 5 (J) is supplied to input terminals (h) and (i) in the braking signal generating circuit 10, the differentiation by the resistor $R_{18}$ and the capacitor $C_5$ is initiated to produce negative and positive pulse signals as shown in FIG. 5(L). Then, the recitification by the diode $D_5$ is initiated so as to pass the negative pulse alone, which is then supplied to the monostable multivibrator to generate the braking pulse as shown in FIG. 5(M) to be held only by the time constant determined by the resistor $VR_2$ and the capacitor $VC_2$. The pulse so generated is amplified by the transistor $Q_{19}$ and thereafter is supplied to the common terminal (p) of the aforementioned switching means 11'. Since a turn-on time of the braking signal responds to a turn-off time of the motor driving pulse shown in FIG. 5, this braking pulse may be supplied through the switching means 11' to the motor for a fixed time from the initial stage of a suspension period of motor driving current so as to apply the braking action to the motor as described with reference to FIG. 3. The interval of the braking pulse may be suitably determined by varying the values of the resistor $VR_2$ and the capacitor $VC_2$.

According to the braking action as described above, current in the direction reversed to that of the driving current is passed through the motor for a short period of time within a period of suspending conduction of driving current to give rise to torque in the direction reversed to the previous direction of rotation, resulting in application of braking action to the motor during conduction of the braking current so as to drive the motor into the same state as is applied with an apparent load thereby increasing a conduction time of driving current to be taken place thereafter, that is, duty being increased. From this reason, torque fluctuation may be removed.

From the foregoing detailed description it will be appreciated that the present invention provides an effectively improved synchronous drive system for a D.C. motor in terms of the torque characteristic heretofore lacking in conventional structure by incorporating therein the above-described duty controlling signal in the second signal system or the braking signal in the third signal system in addition to the circuit structure of the first signal system for the purpose of synchronously driving the D.C. motor, or by using in combination of both of the second and third signal systems. That is, if the reference signal for the synchronous drive is shifted in phase to form a delayed reference signal so that waveform of said signal is selected in value close to 100% of duty, driving current of motor may also be formed into current of duty almost close to a direct current, thus minimizing the irregularity of torque. Particularly, even when the motor is driven with a low torque, it may be driven at a great duty to obtain the highly accurate torque characteristics thereby. Furthermore, the synchronous drive system of the present invention provides a bridge circuit in the output stage of the motor driving circuit, two input terminals thereof being reversely switched so that the motor may be reversely rotated, and an arrangement so designed that driving input and braking input are separately supplied to the output stage whereby extremely stabililzed synchronous rotation may be obtained without torque fluctuation.

I claim:
1. A drive system for a D.C. motor comprising:
   reference signal generating means having a predetermined frequency, motor speed detecting means for generating a signal of frequency corresponding to rotational speed of the D.C. motor, synchronous drive controlling means for the motor, said controlling means being disposed so as to receive signals from said reference signal generating means and signals from said motor speed detecting means and generating driving signals for the motor corresponding to the phase difference between both said signals, delaying means connected to said reference signal generating means to delay said reference signal for a predetermined time, and adjusting means capable of being connected to said delaying means and said synchronous drive controlling means and comparing input signals from both said means so as to adjust the output of said synchronous drive controlling means, said adjusting means controlling duty of driving current for the D.C. motor to the value close to approximately 100%.

2. The drive system according to claim 1 in which said output adjusting means includes a circuit for delaying phase of said reference signal to a predetermined value not greater than one period of said reference signal.

3. The drive system according to claim 1 in which said output adjusting means further includes a circuit for delaying phase of said reference signal to a predetermined value, a first D-A converter connected to said delaying circuit, a second D-A converter connected to said synchronous drive controlling means to convert a signal from said means into an analog amount, and a comparing circuit connected to said first and second D-A converters to compare both analog signals therefrom and to generate controlling signals to set duty of the D.C. motor to the value close to approximately 100%.

4. The drive system according to claim 1 in which said output adjusting means further includes a transistor circuit for regulating input voltage from said synchronous drive controlling means.

5. The drive system according to claim 1 in which said motor synchronous drive controlling means includes a flip-flop circuit set by the reference signal from said reference signal generating means and reset by the signal from said motor speed detecting means.

6. The drive system according to claim 1 in which said synchronous drive controlling means includes D.C. motor reversion switching means.

7. A drive system for a D.C. motor comprising:

reference signal generating means having a predetermined frequency to synchronize a D.C. motor, motor speed detecting means for generating a signal of frequency corresponding to rotational speed of the D.C. motor, first control signal generating means for generating motor synchronous driving signals, said first control signal generating means generating signals according to the first signal system for synchronously driving the D.C. motor in response to the signal from said reference signal generating means and the signal from said speed detecting means, and second control signal generating means for controlling duty of the D.C. motor, said second means being so related as to apply output to the final stage of said first control means and to generate controlling signals to set duty of driving current of the D.C. motor to the value close to approximately 100%.

8. The drive system according to claim 7 in which said second control signal generating means includes delaying means for delaying phase of said reference signal by a predetermined time lag in order to form the reference signal so as to set said duty to the value close to approximately 100%.

9. The drive system according to claim 7 in which said first control signal generating means includes means for amplifying signals for driving the D.C. motor in the final stage of the signal system in said first controlling means.

10. The drive system according to claim 9 in which said second control signal generating means includes means connected to the input side of said amplifying means to adjust the level of voltage applied to said amplifying means from the power source.

11. The drive system according to claim 9 in which said amplifying means includes a bridge connection type transistor circuit.

12. A drive system for a D.C. motor comprising:

reference signal generating means having a predetermined frequency to synchronize a D.C. motor, motor speed detecting means for generating a signal of frequency corresponding to rotational speed of the D.C. motor, D.C. motor drive controlling means for generating a D.C. motor energizing signal in response to the input of said reference signal and an interrupting signal of D.C. motor energizing in response to the signal input from said motor speed detecting means so as to synchronize with the frequency of said reference signal, and D.C. motor braking signal generating means with a phase corresponding to the signal from said motor speed detecting means, said braking signal generating means being connected to the motor so as to feed the braking signal held for a predetermined time to the D.C. motor when energization for driving the D.C. motor is interrupted, whereby said motor may overcome the braking action and duration of energization at the time of drive may be prolonged to increase duty.

13. The drive system according to claim 12 in which said braking signal generating means includes a monostable multivibrator driven into operative condicion with a phase in response to the output signal from said motor speed detecting means.

14. The drive system according to claim 12 in which said D.C. motor drive controlling means includes a flip-flop circuit, said circuit being set in response to the input of said reference signal and reset in response to the signal input from said motor speed detecting means, signal switching means, said switching means reversing output channels of the output signal from said flip-flop circuit and the output signal from said braking signal generating means, and symmetrical amplifying means, said amplifying means being connected to output side of said signal switching means to reverse the driving direction of D.C. motor in response to the reversion of output signal thereof.

15. The drive system according to claim 14 in which said symmetrical amplifying means includes a bridge type transistor circuit.

16. A drive system for a D.C. motor comprising:
reference signal generating means having a predetermined frequency to synchronize a D.C. motor,
motor speed detecting means for generating a signal of frequency corresponding to rotational speed of the D.C. motor,
a flip-flop circuit set in response to the input of said reference signal and reset in response to the input of the output signal from said motor speed detecting means,
a bridge type transistor circuit for amplifying output from said flip-flop circuit,
a delaying circuit connected to said reference signal generating means to delay the phase of said reference signal for a fixed time within a period of said signal,
a comparing circuit for comparing a signal corresponding to output from said flip-flop circuit with a signal corresponding to output from said delaying circuit to thereby generate a signal corresponding to the difference therebetween, and
an adjusting circuit connected to said comparing circuit and said transistor circuit to adjust the voltage level of power source applied to said transistor circuit in response to output of said comparing circuit, whereby duty of driving current supplied to the D.C. motor from said transistor circuit may be increased.

* * * * *